United States Patent
Yeh et al.

(10) Patent No.: US 10,579,186 B2
(45) Date of Patent: Mar. 3, 2020

(54) METHOD AND DETECT CIRCUIT FOR SELECTING TOUCH DETECTION TIME

(71) Applicant: AU Optronics Corporation, Hsin-Chu (TW)

(72) Inventors: Szu-Che Yeh, Hsin-Chu (TW); Chi-Cheng Chen, Hsin-Chu (TW); Feng-Ming Hsu, Hsin-Chu (TW); Gui-Wen Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/043,301

(22) Filed: Jul. 24, 2018

(65) Prior Publication Data
US 2019/0034023 A1    Jan. 31, 2019

(30) Foreign Application Priority Data
Jul. 25, 2017    (TW) .............................. 106124931 A

(51) Int. Cl.
*G06F 3/041* (2006.01)
*G06F 3/0354* (2013.01)

(52) U.S. Cl.
CPC ........ *G06F 3/0416* (2013.01); *G06F 3/03545* (2013.01); *G06F 3/0418* (2013.01)

(58) Field of Classification Search
CPC ... G06F 3/0416; G06F 3/03545; G06F 3/0418
See application file for complete search history.

(56) References Cited

U.S. PATENT DOCUMENTS

| | | | |
|---|---|---|---|
| 8,451,244 B2 | 5/2013 | Hotelling et al. | |
| 8,970,547 B2 | 3/2015 | Sabo et al. | |
| 2013/0194229 A1* | 8/2013 | Sabo | G06F 3/044 345/174 |
| 2013/0293511 A1* | 11/2013 | Nam | G06F 3/044 345/174 |
| 2014/0368749 A1 | 12/2014 | Alonso et al. | |
| 2018/0239493 A1* | 8/2018 | Khazeni | G06F 3/0418 |

FOREIGN PATENT DOCUMENTS

| | | |
|---|---|---|
| CN | 103353816 A | 10/2013 |
| CN | 104699288 A | 6/2015 |

OTHER PUBLICATIONS

An office action issued by CNIPA dated Nov. 4, 2019.

* cited by examiner

*Primary Examiner* — Lisa S Landis
(74) *Attorney, Agent, or Firm* — WPAT, PC

(57) ABSTRACT

A method and a detection circuit for selecting a touch detection time are provided. The method for selecting a touch detection time includes the following steps: detecting a noise signal of a touch panel in a first display frame period; determining whether signal strength of the noise signal in a first time segment in the first display frame period is greater than a first noise threshold; and when the signal strength of the noise signal in the first time segment in the first display frame period is less than the first noise threshold, performing touch control in a second time segment in a second display frame period corresponding to the first time segment.

14 Claims, 6 Drawing Sheets

METHOD AND DETECT CIRCUIT FOR SELECTING TOUCH DETECTION TIME

BACKGROUND

Technical Field

The present invention relates to a method and a detection circuit for touch detection, and in particular, to a method and a detection circuit for selecting a touch detection time.

Related Art

Recently, notebook computers and tablet computers having touch displays gradually replace conventional computers, and become main products in the market. A notebook computer or a tablet computer having a touch display may even be used with a stylus, and is suitable for rapidly recording conference results and writing notes by business personnel.

When a stylus approaches but does not touch a touch display, a touch sensing unit on a touch display needs to detect an approximate position of the stylus. However, noise on glass on the touch display affects the determining of a position and the accuracy of the determining when the stylus approaches and touches the touch display. Therefore, how to accurately determine a touch point position under noise interference is one of objectives that are desired to be achieved in the industry.

SUMMARY

According to a first aspect of the present invention, a method for selecting a touch detection time is provided. The method for selecting a touch detection time includes the following steps: detecting a noise signal of a touch panel in a first display frame period; determining whether signal strength of the noise signal in a first time segment in the first display frame period is greater than a first noise threshold; and when the signal strength of the noise signal in the first time segment in the first display frame period is less than the first noise threshold, performing touch control in a second time segment in a second display frame period corresponding to the first time segment.

According to a second aspect of the present invention, a detection circuit for selecting a touch detection time is provided. The detection circuit includes a multiplexer (MUX), a comparator, and a processing unit. The MUX is configured to receive a noise signal of a touch panel that is detected by a sensing unit in a first display frame period. The comparator is configured to determine whether signal strength of the noise signal in a first time segment in the first display frame period is greater than a first noise threshold. When the signal strength of the noise signal in the first time segment in the first display frame period is less than the first noise threshold, the processing unit outputs a touch switch signal, to enable a touch control unit to perform touch control in a second time segment in a second display frame period corresponding to the first time segment.

To better understand the foregoing and other aspects of the present invention, embodiments are described in detail below with reference to the accompanying drawings.

DETAILED DESCRIPTION

Various embodiments are provided and described in detail below. However, the embodiments are merely described as examples, but are not intended to limit the protection scope of the present invention. In addition, some elements are omitted in the figures of the embodiments, to clearly show technical features of the present invention. Same numerals in all the figures are used to represent same or similar elements.

Figure 1A:
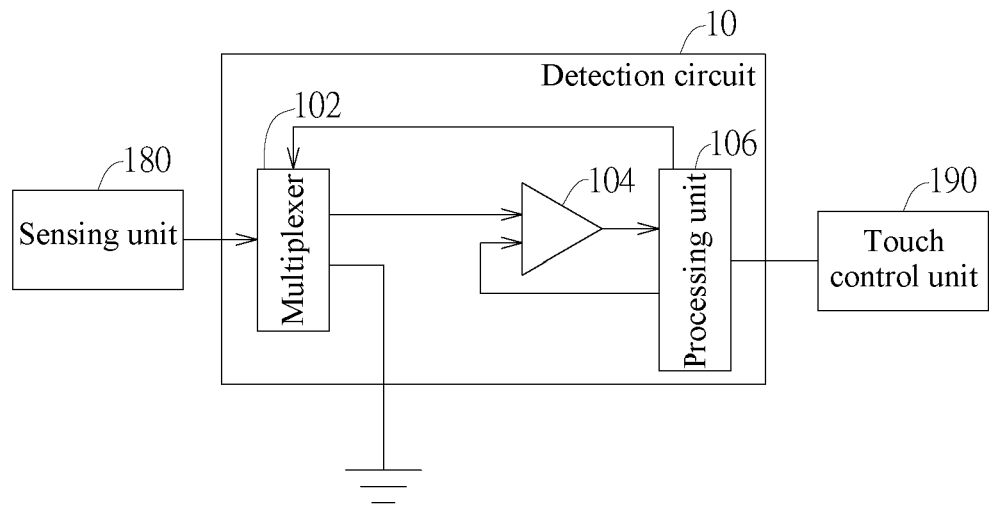
FIG. 1A is a schematic diagram of connections between a detection circuit, a sensing unit, and a touch panel control circuit according to an embodiment of the present invention.

Referring to FIG. 1A, FIG. 1A is a schematic diagram of connections between a detection circuit 10, a sensing unit 180, and a touch control unit 190 according to an embodiment of the present invention. The detection circuit 10 includes a MUX 102, a comparator 104, and a processing unit 106. The MUX 102 is coupled to the sensing unit 180, the comparator 104, and the processing unit 106. An input pin of the MUX 102 is coupled to the sensing unit 180, to receive a signal from the sensing unit 180. An output pin of the MUX 102 may be grounded or be connected to a direct current voltage (for example, 1 volt or 5 volts). The other output pin of the MUX 102 is coupled to the comparator 104. The comparator 104 is coupled to the MUX 102 and the processing unit 106. The comparator 104 receives a signal from the MUX 102, and compares to determine a relationship between the received signal and a specified value. For example, the specified value may be from the processing unit 106.

The processing unit 106 is coupled to the MUX 102, the comparator 104, and the touch control unit 190. The processing unit 106 receives a comparison result of the comparator 104, to learn that a signal received by the sensing unit 180 is greater than or less than the specified value. The processing unit 106 further includes a counter. The counter is configured to calculate a time from vertical synchronization (V-Sync) and horizontal synchronization (H-Sync) until panel noise decreases.

The sensing unit 180 is configured to sense panel noise on a touch panel (not shown). In an embodiment of the present invention, the sensing unit 180 may be, for example, a black matrix (BM) having a conductivity characteristic. The BM may prevent a color resist (for example, an RGB resist) from mixing colors, increase a RGB comparison value, and shield an intended opaque part or an invisible area excluding pixels, for example, shield a line configuration of indium tin oxide (ITO) or shield a thin-film transistor (TFT). The touch control unit 190 is configured to perform touch control on the touch panel.

Figure 1B:
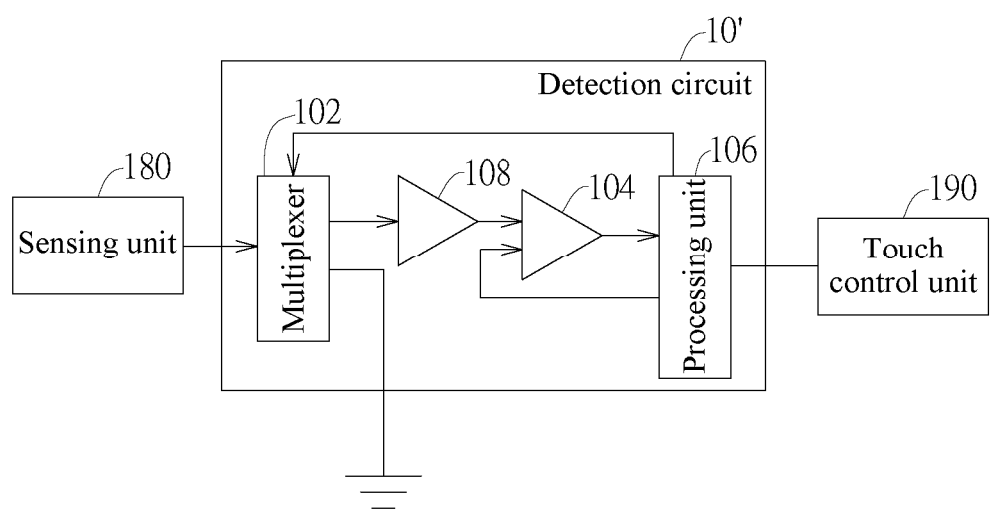
FIG. 1B is a schematic diagram of connections between a detection circuit, a sensing unit, and a touch panel control circuit according to another embodiment of the present invention.

Referring to FIG. 1B, FIG. 1B is a schematic diagram of connections between a detection circuit 10', a sensing unit 180, and a touch control unit 190 according to another embodiment of the present invention. The detection circuit 10' in this embodiment is similar to the detection circuit 10 in the foregoing embodiment, and same or similar elements are represented by same numerals. Same configurations in the detection circuit 10' and the detection circuit 10 are not described herein again. In this embodiment, a main difference between the detection circuit 10' and the detection circuit 10 is that, the detection circuit 10' further includes an amplifier 108. The amplifier 108 is coupled to the MUX 102 and the comparator 104. The amplifier 108 receives a signal from the MUX 102, properly amplifies the signal from the MUX 102, and then transmits the amplified signal to the comparator 104.

In an embodiment of the present invention, the detection circuit 10 and the detection circuit 10' may be disposed on a circuit board of a timing controller (TCON). For example, the foregoing MUX 102, the comparator 104, the processing unit 106, the amplifier 108, the sensing unit 180, and the touch control unit 190 may be implemented by using a wafer, a circuit block inside a wafer, a firmware circuit, a circuit board including a plurality of electronic elements and wires, or a storage medium storing a plurality of sets of code, or may be implemented by performing corresponding software or a corresponding program by an electronic device such as a computer system or a server.

Figure 2:
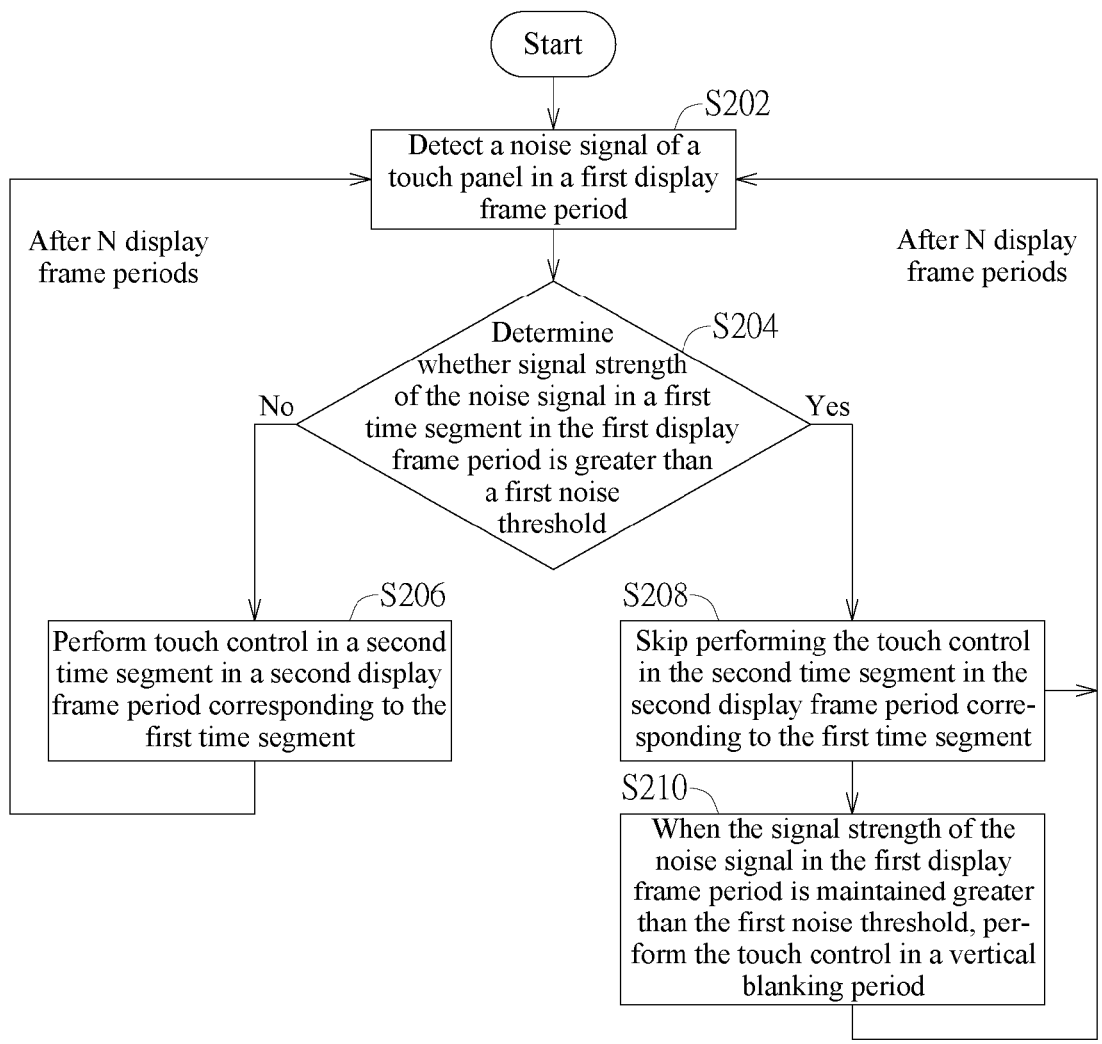
FIG. 2 is a flowchart of a method for selecting a touch detection time according to an embodiment of the present invention.
Figure 3A:
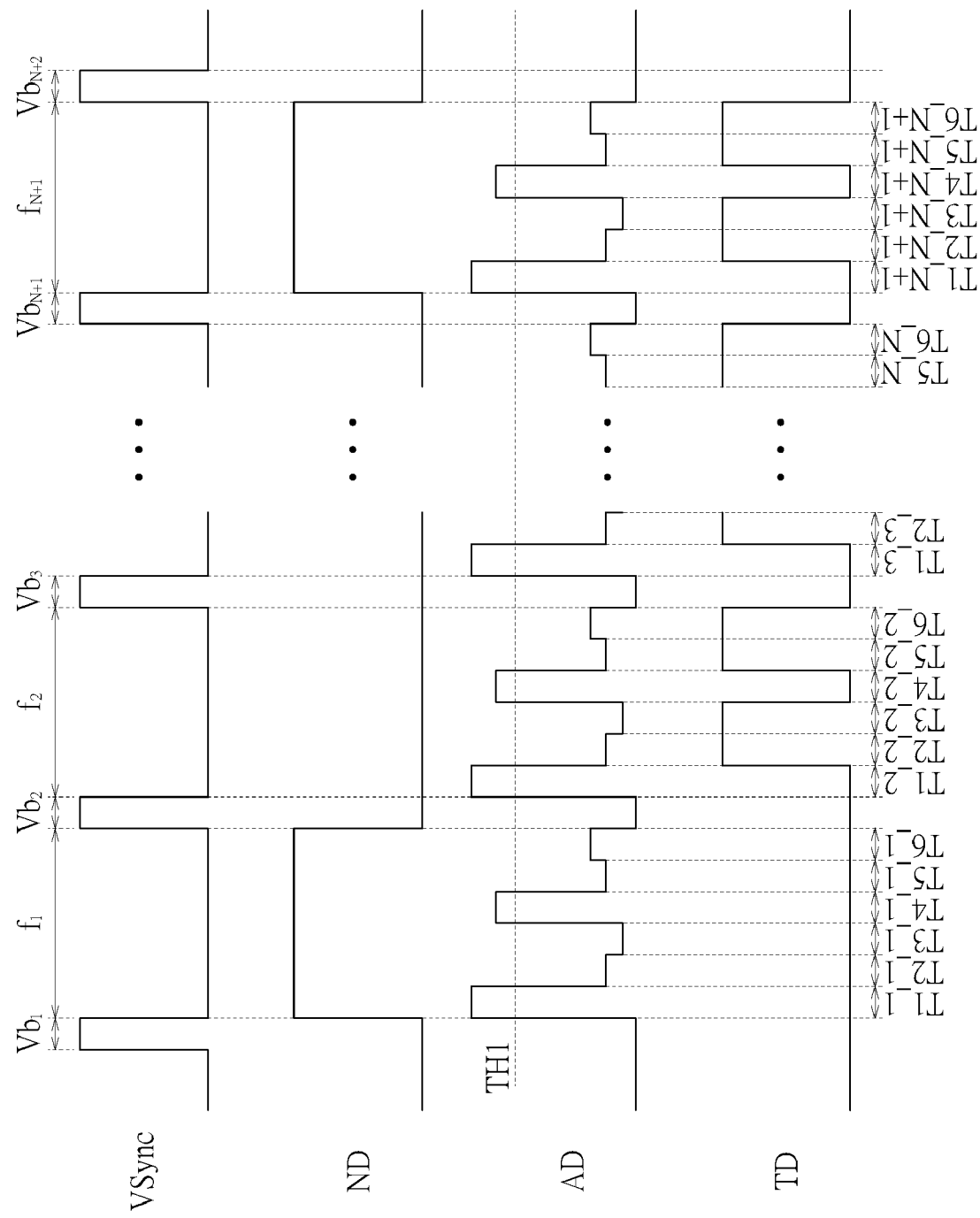
FIG. 3A is a schematic diagram of detection of a noise time and selection of a touch detection time according to an embodiment of the present invention.
Figure 3B:
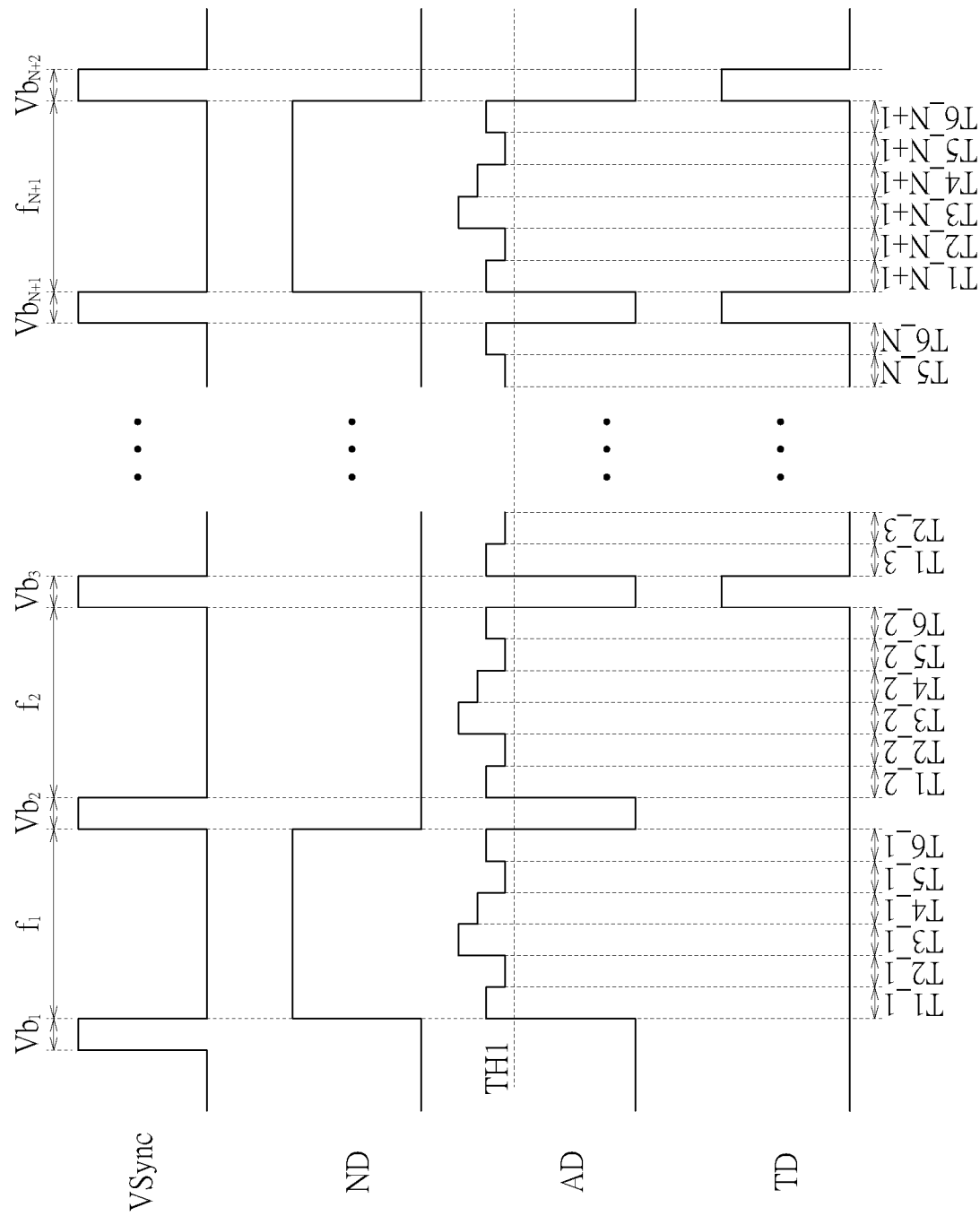
FIG. 3B is a schematic diagram of detection of a noise time and selection of a touch detection time according to another embodiment of the present invention.

Refer to FIG. 1A, FIG. 1B, FIG. 2, FIG. 3A, and FIG. 3B. FIG. 2 is a flowchart of a method for selecting a touch detection time according to an embodiment of the present invention. FIG. 3A is a schematic diagram of detection of a noise time and selection of a touch detection time according to an embodiment of the present invention. FIG. 3B is a schematic diagram of detection of a noise time and selection of a touch detection time according to another embodiment of the present invention. The method for selecting a touch detection time shown in FIG. 2 may be applied to the detection circuit 10 shown in FIG. 1A and the detection circuit 10' shown in FIG. 1B. To clearly describe operation of the foregoing elements and the method for selecting a touch detection time in the embodiments of the present invention, the following provides detailed description with reference to FIG. 2, FIG. 3A, and FIG. 3B. However, a person of ordinary skill in the art of the present invention may learn that, use of the method for selecting a touch detection time in the embodiments of the present invention is neither limited to the detection circuit 10 in FIG. 1A and the detection circuit 10' in FIG. 1B, nor limited to a sequence of all steps in the flowchart of FIG. 2.

According to an embodiment of the present invention, before a touch panel acts, the sensing unit 180 detects a noise signal (for example, a noise signal AD in FIG. 3A and FIG. 3B) of the touch panel in a first display frame period (for example, a time range $f_1$ in FIG. 3A and FIG. 3B). A main source of the noise signal of the touch panel is signal changes (voltage differences) of a TFT, a gate line, a source line, and a MUX.

In step S202, the MUX 102 receives the noise signal (for example, the noise signal AD in FIG. 3A and FIG. 3B) of the touch panel that is detected by the sensing unit 180 in the first display frame period (for example, the time range $f_1$ in FIG. 3A and FIG. 3B). After receiving the noise signal of the touch panel that is detected by the sensing unit 180 in the first display frame period, the MUX 102 transmits the noise signal to the comparator 104. For example, a display frame period may be 16.6667 milliseconds (ms).

Next, in step S204, the comparator 104 determines whether signal strength of the noise signal in a first time segment (for example, a time segment T1_1 or a time segment T2_1 in the time range $f_1$ in FIG. 3A) in the first display frame period (for example, the time range $f_1$ in FIG. 3A) is greater than a first noise threshold (for example, a first noise threshold TH1 in FIG. 3A). For example, the first noise threshold may be input by the processing unit 106 into the comparator 104. For example, the first noise threshold may be 5 volts. It should be understood that, the first noise threshold may be any positive integer.

When the signal strength of the noise signal in the first time segment (for example, the time segment T2_1 in the time range $f_1$ in FIG. 3A) in the first display frame period (for example, the time range $f_1$ in FIG. 3A) is less than the first noise threshold (for example, the first noise threshold TH1 in FIG. 3A) (a result of step S204 is no), the processing unit 106 outputs a touch switch signal (for example, a touch switch signal TD in FIG. 3A) to the touch control unit 190, to enable the touch control unit 190 to perform touch control in a second time segment (for example, a time segment T2_2 in a time range $f_2$ in FIG. 3A) in a second display frame period (the time range $f_2$ in FIG. 3A) corresponding to the first time segment (for example, the time segment T2_1 in the time range $f_1$ in FIG. 3A) (step S206).

When the signal strength of the noise signal in the first time segment (for example, the time segment T1_1 in the time range $f_1$ in FIG. 3A) in the first display frame period (for example, the time range $f_1$ in FIG. 3A) is greater than the first noise threshold (for example, the first noise threshold TH1 in FIG. 3A) (a result of step S204 is yes), the processing unit 106 outputs a touch switch signal (for example, the touch switch signal TD in FIG. 3A) to the touch control unit 190, to enable the touch control unit 190 to skip performing touch control in the second time segment (for example, a time segment T1_2 in the time range $f_2$ in FIG. 3A) in the second display frame period (the time range $f_2$ in FIG. 3A) corresponding to the first time segment (for example, the time segment T1_1 in the time range $f_1$ in FIG. 3A) (step S208).

When the signal strength of the noise signal in the first display frame period (for example, the time range $f_1$ in FIG. 3B) is maintained greater than the first noise threshold (the first noise threshold TH1 in FIG. 3B), the processing unit 106 outputs a touch switch signal to the touch control unit 190, to enable the touch control unit 190 to perform touch control in a vertical blanking period (v-blanking period) (for example, a vertical blanking period $Vb_3$ in FIG. 3B) (step S210). That is, when the signal strength of the noise signal in the first display frame period (for example, the time range $f_1$ in FIG. 3B) is always greater than the first noise threshold (for example, the first noise threshold TH1 in FIG. 3B), the touch control unit 190 performs the touch control in the vertical blanking period (for example, the vertical blanking period $Vb_3$ in FIG. 3B) instead of performing the touch control in the second display frame period (for example, the time range $f_2$ in FIG. 3B).

In an embodiment of the present invention, when the touch control unit 190 does not act, the detection circuit 10 or the detection circuit 10' may detect the noise signal of the touch panel again after N display frame periods, to ensure that an external environment cannot affect a touch sensing element on the touch panel. The MUX 102 receives a noise signal of the touch panel that is detected by the sensing unit 180 in an $(N+1)^{th}$ display frame period, and transmits the noise signal to the comparator 104 again, to determine a relationship between signal strength of the noise signal in each time segment in the $(N+1)^{th}$ display frame period and the first noise threshold. The processing unit 106 outputs a touch switch signal according to a result of the determining, to instruct the touch control unit to perform touch control in a corresponding time segment in a subsequent display frame period or in a vertical blanking period. That is, the method for selecting a touch detection time in FIG. 2 may be performed again from step S202 after N display frame periods. N is a positive integer.

In another embodiment of the present invention, for example, the method for selecting a touch detection time in FIG. 2 may be performed again after a fixed period of time (for example, 30 minutes or 1 hour). In another embodiment of the present invention, for example, the method for selecting a touch detection time in FIG. 2 may be performed again after an environment of the touch panel changes. The foregoing changes in the environment may be, for example, use of a transformer for a power supply or replacement of a used transformer.

In an embodiment of the present invention, a V-Sync signal VSync in FIG. 3A represents that a vertical blanking signal (v-blanking) is transmitted before a display frame. The vertical blanking signal has a vertical blanking period (v-blanking period). The vertical blanking period includes a first vertical blanking period $Vb_1$, a second vertical blanking period $Vb_2$, a third vertical blanking period $Vb_3$, . . . , and an $N^{th}$ vertical blanking period $Vb_N$, an $(N+1)^{th}$ vertical blanking period $Vb_{N+1}$, and an $(N+2)^{th}$ vertical blanking period $Vb_{N+2}$. Each display frame has a display frame period. The display frame period includes the first display frame period $f_1$, the second display frame period $f_2$, a third display frame period $f_3$, . . . , an $N^{th}$ display frame period $f_N$, and an $(N+1)^{th}$ display frame period $f_{N+1}$.

Referring to FIG. 3A, when the sensing unit 180 detects the noise signal AD of the touch panel in the first display frame period $f_1$, a noise detection signal ND is enabled in the first display frame period $f_1$. After receiving the noise signal AD of the touch panel that is detected by the sensing unit 180 in the first display frame period $f_1$, the MUX 102 transmits the noise signal AD to the comparator 104. The comparator 104 determines whether signal strength of the noise signal AD in each time segment in the first display frame period $f_1$ is greater than the first noise threshold TH1.

For example, in FIG. 3A, when the comparator 104 determines that the signal strength of the noise signal AD in the time segment T2_1 in the first display frame period $f_1$ is less than the first noise threshold TH1, the processing unit 106 outputs the touch switch signal TD, to enable the touch control unit 190 to perform touch control in the time segment T2_2 in the second display frame period $f_2$ corresponding to the time segment T2_1. The touch switch signal TD is enabled in the time segment T2_2 in the second display frame period $f_2$. For example, when the signal strength of the noise signal AD in a time segment T3_1 in the first display frame period $f_1$ is less than the first noise threshold TH1, the processing unit 106 outputs the touch switch signal TD, to enable the touch control unit 190 to perform the touch control in a time segment T3_2 in the second display frame period $f_2$ corresponding to the time segment T3_1. The touch switch signal TD is enabled in the time segment T3_2 in the second display frame period $f_2$. That is, the touch control may be performed on the touch panel in the time segment T2_2 or the time segment T3_2 in the second display frame period $f_2$, and a touch of a finger or a stylus is detected.

For example, in FIG. 3A, when the comparator 104 determines that the signal strength of the noise signal AD in the time segment T1_1 in the first display frame period $f_1$ is greater than the first noise threshold TH1, the processing unit 106 outputs the touch switch signal TD, to enable the touch control unit 190 to skip performing the touch control in the time segment T1_2 in the second display frame period $f_2$ corresponding to the time segment T1_1. The touch switch signal TD is not enabled in the time segment T1_2 in the second display frame period $f_2$. For example, when signal strength of the noise signal AD in a time segment T4_1 in the first display frame period $f_1$ is greater than the first noise threshold TH1, the processing unit 106 outputs the touch switch signal TD, to enable the touch control unit 190 to skip performing the touch control in a time segment T4_2 in the second display frame period $f_2$ corresponding to the time segment T4_1. The touch switch signal TD is not enabled in the time segment T4_2 in the second display frame period $f_2$. That is, the touch control is not performed on the touch panel in the time segment T1_2 or the time segment T4_2 in the second display frame period $f_2$, and a touch of a finger or a stylus is not detected.

FIG. 3B is similar to FIG. 3A, and similar or same parts are not described herein again. Refer to FIG. 3B. In an embodiment of the present invention, when the comparator 104 determines that the signal strength of the noise signal AD in the first display frame period $f_1$ is maintained greater than the first noise threshold TH1, as shown by the noise signal AD in FIG. 3B, the processing unit 106 outputs the touch switch signal TD, to enable the touch control unit 190 to perform the touch control in the vertical blanking period $Vb_3$, and skip performing the touch control in the second display frame period $f_2$. The touch switch signal TD is not enabled in the second display frame period $f_2$, and the touch switch signal TD is enabled in the vertical blanking period $Vb_3$. The foregoing touch control includes finger touch detection and stylus touch detection.

Figure 4:
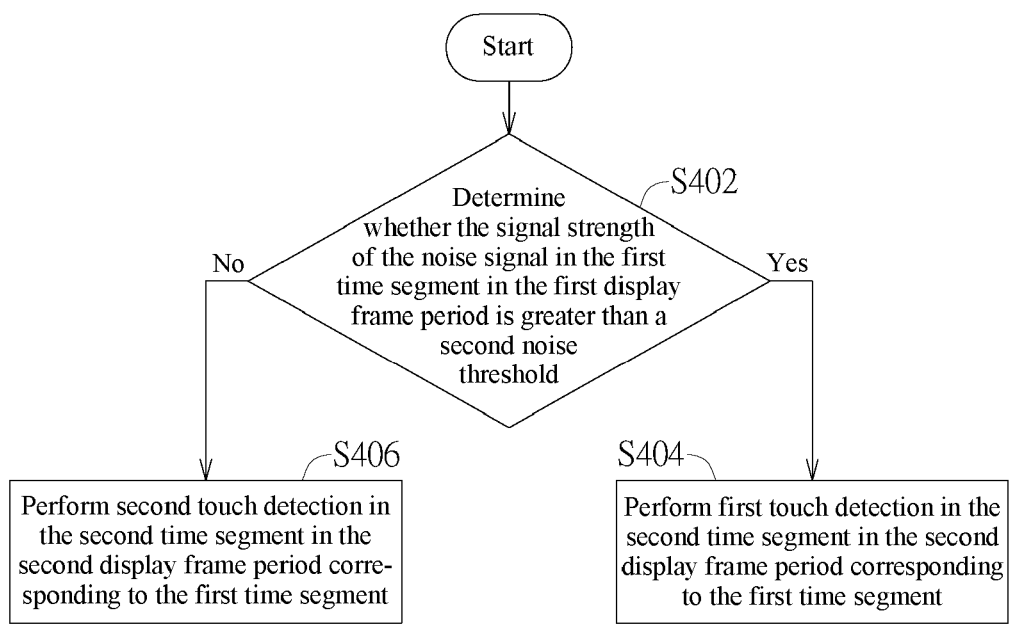
FIG. 4 is a flowchart of performing touch control according to an embodiment of the present invention.
Figure 5:
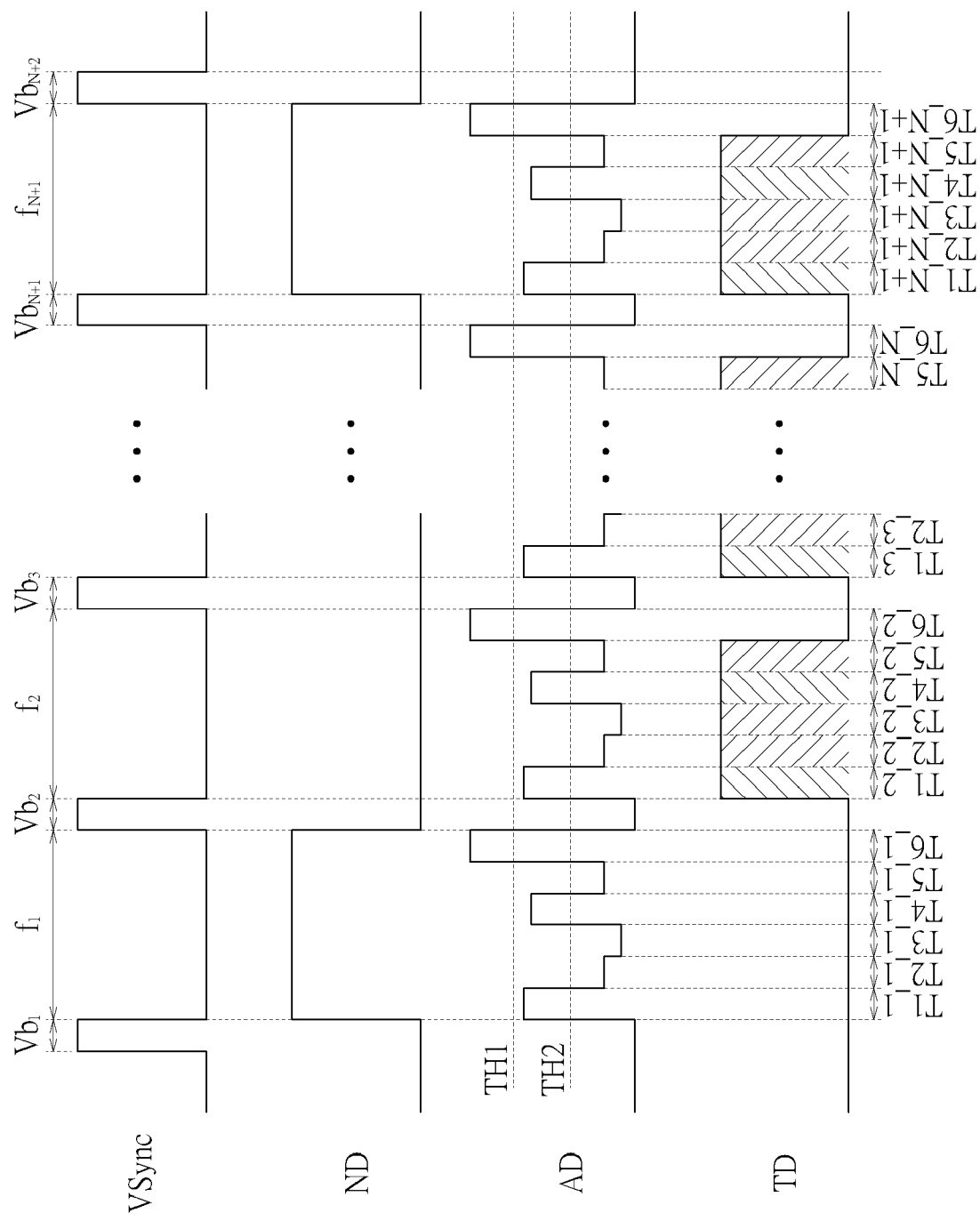
FIG. 5 is a schematic diagram of detection of a noise time and selection of a touch detection time according to an embodiment of the present invention.

Refer to FIG. 1A, FIG. 1B, FIG. 2, FIG. 4, and FIG. 5. FIG. 4 is a flowchart of performing touch control according to an embodiment of the present invention. In step S206 in FIG. 2, when the signal strength of the noise signal in the first time segment in the first display frame period is less than the first noise threshold, the processing unit 106 outputs the touch switch signal to the touch control unit 190, to enable the touch control unit 190 to perform the touch control in the second time segment in the second display frame period corresponding to the first time segment. A noise signal of the touch panel when stylus touch detection is performed needs to be weaker than a noise signal of the touch panel when finger touch detection is performed. Step S402 to step S406 in FIG. 4 further describe a process of step S206 of performing the touch control in FIG. 2. In this embodiment, a second noise threshold is further set. The second noise threshold is less than the first noise threshold. FIG. 5 is a schematic diagram of detection of a noise time and selection of a touch detection time according to another embodiment of the present invention. FIG. 5 is similar to FIG. 3A. Therefore, similar or same parts are not described herein again.

The method for performing touch control shown in FIG. 4 may be applied to the detection circuit 10 shown in FIG. 1A and the detection circuit 10' shown in FIG. 1B. To clearly describe operation of the foregoing elements and the method for selecting a touch detection time in the embodiments of the present invention, the following provides detailed description with reference to FIG. 4 and FIG. 5. However, a person of ordinary skill in the art of the present invention may learn that, use of the method for selecting a touch detection time in the embodiments of the present invention is neither limited to the detection circuit 10 in FIG. 1A and the detection circuit 10' in FIG. 1B, nor limited to a sequence of all steps in the flowchart of FIG. 4.

According to an embodiment of the present invention, first, in step S402, the comparator 104 further determines whether the signal strength of the noise signal (for example, a noise signal AD in FIG. 5) of the touch panel in the first time segment (for example, a time segment T1_1 or time segment T2_1 in a time range $f_1$ in FIG. 5) in the first display frame period (for example, the time range $f_1$ in FIG. 5) is greater than the second noise threshold (for example, a second noise threshold TH2 in FIG. 5).

When the comparator 104 determines that the signal strength of the noise signal (for example, the noise signal AD in FIG. 5) in the first time segment (for example, the time segment T1_1 in the time range $f_1$ in FIG. 5) in the first display frame period (for example, the time range $f_1$ in FIG. 5) is greater than the second noise threshold (for example, the second noise threshold TH2 in FIG. 5) (a result of step S402 is yes), the processing unit 106 outputs the touch switch signal TD, to enable the touch control unit 190 to perform first touch detection in the second time segment (for example, a time segment T1_2 in a time range $f_2$ in FIG. 5) in the second display frame period (for example, the time range $f_2$ in FIG. 5) corresponding to the first time segment (for example, the time segment T1_1 in the time range $f_1$ in FIG. 5) (step S404).

When the comparator 104 determines that the signal strength of the noise signal (for example, the noise signal AD in FIG. 5) in the first time segment (for example, the segment T2_1 in the time range $f_1$ in FIG. 5) in the first display frame period (for example, the time range $f_1$ in FIG. 5) is less than the second noise threshold (for example, the second noise threshold TH2 in FIG. 5) (a result of step S402 is no), the processing unit 106 outputs the touch switch signal TD, to enable the touch control unit 190 to perform second touch detection in the second time segment (for example, a time segment T2_2 in the time range $f_2$ in FIG. 5) in the second display frame period (for example, the time range $f_2$ in FIG. 5) corresponding to the first time segment (for example, the time segment T2_1 in the time range $f_1$ in FIG. 5) (step S406).

Refer to FIG. 5. In this embodiment, when the sensing unit 180 detects the noise signal AD of the touch panel in the first display frame period $f_1$, the noise detection signal ND is enabled in the first display frame period $f_1$. After receiving the noise signal AD of the touch panel that is detected by the sensing unit 180 in the first display frame period $f_1$, the MUX 102 transmits the noise signal AD to the comparator 104.

For example, the comparator 104 determines that the signal strength of the noise signal AD in the time segment T1_1 in the first display frame period $f_1$ is less than the first noise threshold TH1. Next, the comparator 104 determines that the signal strength of the noise signal AD in the time segment T1_1 in the first display frame period $f_1$ is greater than the second noise threshold TH2. The processing unit 106 outputs the touch switch signal TD, to enable the touch control unit 190 to perform first touch detection in the time segment T1_2 in the second display frame period $f_2$ corresponding to the time segment T1_1. The touch switch signal TD is enabled in the time segment T1_2 in the second display frame period $f_2$.

For example, the comparator 104 determines that the signal strength of the noise signal AD in the time segment T2_1 in the first display frame period $f_1$ is less than the first noise threshold TH1. Next, the comparator 104 determines that the signal strength of the noise signal AD in the time segment T2_1 in the first display frame period $f_1$ is less than the second noise threshold TH2. The processing unit 106 outputs the touch switch signal TD, to enable the touch control unit 190 to perform second touch detection in the time segment T2_2 in the second display frame period $f_2$ corresponding to the time segment T2_1. The touch switch signal TD is enabled in the time segment T1_2 in the second display frame period $f_2$.

For example, the comparator 104 determines that signal strength of the noise signal AD in a time segment T6_1 in the first display frame period $f_1$ is greater than the first noise threshold TH1. The comparator 104 does not determine whether the signal strength of the noise signal AD in the time segment T6_1 in the first display frame period $f_1$ is greater than the second noise threshold TH2. The processing unit 106 outputs the touch switch signal TD, to enable the touch control unit 190 to skip performing the first touch detection or skip performing the second touch detection in a time segment T6_2 in the second display frame period $f_2$ corresponding to the time segment T6_1, that is, skip performing touch control in the time segment T6_2. The touch switch signal TD is not enabled in the time segment T6_2 in the second display frame period $f_2$.

In FIG. 5, the enabled touch switch signal TD is indicated by different bottoms in different time segments, to separately represent that the touch control unit 190 performs the first touch detection or the second touch detection in the different time segments. The first touch detection is different from the second touch detection. For example, the first touch detection may be finger touch detection, and the second touch detection may be stylus touch detection.

In an embodiment of the present invention, when the processing unit 106 outputs the touch switch signal to enable the touch control unit 190 to start to perform an action in the second display frame period, the MUX 102 may be grounded or connected to a direct current voltage. The touch control unit 190 shields the noise signal of the touch panel by using the sensing unit 180.

According to the method and the detection circuit for selecting a touch detection time that are provided in the embodiments of the present invention, by using a detection circuit, s touch control unit may dynamically select a touch detection time according to strength of panel noise, so that the touch control unit performs touch control in a time range in which the panel noise is relatively weak. The touch control unit may further perform stylus touch detection and finger touch detection separately by using different noise thresholds. Meanwhile, if it is determined that a noise signal of a touch panel is always extremely strong in an entire display frame period, the touch control unit may perform the touch control in a vertical blanking period. A touch point position on the touch panel can be accurately determined under noise interference.

In conclusion, although the present invention is disclosed above through the embodiments, the embodiments are not intended to limit the present invention. A person of ordinary skill in the art of the present invention may make various alternations and modifications without departing from the spirit and scope of the present invention. Therefore, the protection scope of the present invention shall be subject to the scope defined by the appended claims.

What is claimed is:

1. A method for selecting a touch detection time, comprising:
    detecting a noise signal of a touch panel in a first display frame period;

determining whether the noise signal in a first time segment of the first display frame period is greater than a first noise threshold; and performing touch control in a second time segment of a second display frame period corresponding to the first time segment when the noise signal in the first time segment in the first display frame period is less than the first noise threshold.

2. The method according to claim 1, further comprising:

skipping performing the touch control in the second time segment of the second display frame period corresponding to the first time segment when the noise signal in the first time segment is greater than the first noise threshold.

3. The method according to claim 2, further comprising:

performing the touch control in a vertical blanking period when the noise signal in the first display frame period is maintained greater than the first noise threshold.

4. The method according to claim 1, wherein the step of performing touch control in the second time segment in the second display frame period corresponding to the first time segment further comprises:

determining whether the noise signal in the first time segment of the first display frame period is greater than a second noise threshold; and performing a first touch detection in the second time segment of the second display frame period corresponding to the first time segment when the noise signal in the first time segment of the first display frame period is greater than the second noise threshold, wherein the second noise threshold is less than the first noise threshold.

5. The method according to claim 4, further comprising:

performing second touch detection in the second time segment in the second display frame period corresponding to the first time segment when the noise signal in the first time segment of the first display frame period is less than the second noise threshold.

6. The method according to claim 1, further comprising:

shielding the noise signal of the touch panel in the second display frame period.

7. The method according to claim 1, further comprising:

detecting the noise signal of the touch panel after the touch control is performed in N display frame periods, wherein N is a positive integer.

8. A detection circuit for selecting a touch detection time, comprising:

a multiplexer (MUX), for receiving a noise signal of a touch panel that is detected by a sensing unit in a first display frame period;

a comparator, for determining whether the noise signal in a first time segment of the first display frame period is greater than a first noise threshold;

a touch control unit, for performing touch control; and a processing unit, for outputting a touch switch signal to enable the touch control unit to perform touch control in a second time segment of a second display frame period corresponding to the first time segment when the noise signal in the first time segment of the first display frame period is less than the first noise threshold.

9. The detection circuit according to claim 8, wherein the processing unit outputs the touch switch signal to enable the touch control unit to skip performing touch control in the second time segment of the second display frame period corresponding to the first time segment when the signal strength of the noise signal in the first time segment is greater than the first noise threshold.

10. The detection circuit according to claim 9, wherein the processing unit outputs the touch switch signal to enable the touch control unit to perform touch control in a vertical blanking period when the signal strength of the noise signal in the first display frame period is maintained greater than the first noise threshold.

11. The detection circuit according to claim 8, wherein the comparator determines whether the noise signal in the first time segment of the first display frame period is greater than a second noise threshold, the processing unit outputs the touch switch signal to enable the touch control unit to perform a first touch detection in the second time segment of the second display frame period corresponding to the first time segment when the noise signal in the first time segment of the first display frame period is greater than the second noise threshold, and the second noise threshold is less than the first noise threshold.

12. The detection circuit according to claim 11, wherein the processing unit outputs the touch switch signal to enable the touch control unit to perform a second touch detection in the second time segment of the second display frame period corresponding to the first time segment when the noise signal in the first time segment of the first display frame period is less than the second noise threshold.

13. The detection circuit according to claim 8, wherein the MUX is connected to a direct current voltage in the second display frame period for shielding the noise signal of the touch panel.

14. The detection circuit according to claim 8, wherein the MUX receives the noise signal of the touch panel after the touch control unit performs the touch control in N display frame periods, wherein N is a positive integer.

* * * * *